United States Patent [19]
Jang

[11] Patent Number: 5,984,833
[45] Date of Patent: *Nov. 16, 1999

[54] HYDRAULIC CONTROL SYSTEM FOR AN AUTOMATIC TRANSMISSION USED IN VEHICLES

[75] Inventor: Jae-Duk Jang, Kyungki-do, Rep. of Korea

[73] Assignee: Hyundai Motor Company, Seoul, Rep. of Korea

[ * ] Notice: This patent is subject to a terminal disclaimer.

[21] Appl. No.: 09/014,914

[22] Filed: Jan. 28, 1998

[51] Int. Cl.$^6$ ............................. F16H 61/04; F16H 61/26
[52] U.S. Cl. ......................... 477/143; 477/138; 477/154
[58] Field of Search ..................................... 477/138, 139, 477/140, 141, 143, 144, 149, 154, 155

[56] References Cited

U.S. PATENT DOCUMENTS

| | | | |
|---|---|---|---|
| 5,383,820 | 1/1995 | Mori | 477/154 X |
| 5,417,627 | 5/1995 | Iizuka | 477/143 |
| 5,507,706 | 4/1996 | Jang et al. | 477/130 |
| 5,611,749 | 3/1997 | Jang et al. | 477/65 |
| 5,816,950 | 10/1998 | Kamada et al. | 477/148 |

Primary Examiner—Charles A Marmor
Assistant Examiner—Roger Pang

[57] ABSTRACT

Disclosed is a hydraulic control system for an automatic transmission including a plurality of friction elements associated with respective transmission speeds. The hydraulic control system includes a hydraulic fluid source, a line pressure controller, a reducing pressure controller, a range controller, a shift controller, a hydraulic pressure controller, and a hydraulic pressure distributor. The hydraulic pressure distributor further includes a 3-4 shift valve, a 1-2 shift valve, a 2-3/4-3 shift valve, a 4-2 shift valve for realizing port conversion during a 4-2 skip-shifting process to selectively supply/exhaust the control pressure to/from at least one of the friction elements corresponding to the respective transmission speeds, a control switch valve for realizing port conversion to selectively supply/exhaust hydraulic pressure from the shift controller and the control pressure via the 1-2 shift valve to at least one of the friction elements corresponding to the respective transmission speeds, and a solenoid valve for controlling the control switch valve in accordance with a control signal from a transmission control unit.

7 Claims, 13 Drawing Sheets

HYDRAULIC CONTROL SYSTEM FOR AN AUTOMATIC TRANSMISSION USED IN VEHICLES

FIELD OF THE INVENTION

The present invention relates to a hydraulic control system for an automatic transmission used in vehicles.

BACKGROUND OF THE INVENTION

Generally, a conventional automatic transmission used in a vehicle includes a torque converter, a multistage gear shift mechanism connected to the torque converter, and a plurality of friction elements actuated by hydraulic pressure for selecting a gear shift stage of the gear shift mechanism.

The conventional automatic transmission is provided with a hydraulic control system which controls the automatic transmission.

In such a hydraulic control system, hydraulic pressure generated by a hydraulic pump is selectively supplied to each friction element by a plurality of control valves such that automatic shifting is realized in accordance with a driving state of the vehicle and engine throttle opening.

The above described hydraulic control system generally comprises a line pressure controller for regulating hydraulic pressure generated by the hydraulic pump to line pressure, a damper clutch controller for actuating a damper clutch of the torque converter, a reducing pressure controller for reducing line pressure, a range controller for selectively supplying line pressure to lines corresponding to respective shift ranges, a shift controller for supplying hydraulic pressure from the range controller to lines corresponding to respective shift ranges, a hydraulic pressure controller for duty-controlling hydraulic pressure from the range controller into operational pressure operating the friction elements, and a hydraulic pressure distributor for determining a hydraulic flow path corresponding to each shift range by operating valves according to the hydraulic pressure from the shift controller, and suitably distributing the operational pressure to each friction element.

The shift controller operates spool valves of the hydraulic pressure distributor under the control of a transmission control unit, such that the hydraulic flow path corresponding to each shift range is determined to realize shifting.

When changing shift stages, the timing of exhausting hydraulic pressure from one set of friction elements and supplying hydraulic pressure to another set of friction elements through the hydraulic flow path, determined by the shift controller in accordance with each shift range, greatly influences shift quality. However, mis-timing can cause an abrupt increase in engine revolutions or locking of the shift mechanism. Further, abrupt changes in hydraulic pressure levels in the hydraulic flow path decreases the life span of the automatic transmission.

In order to improve shift quality and durability of the transmission by both accurately controlling the timing of pressure supply and minimizing changes in hydraulic pressure levels, a method of modifying shift valve structure has been developed. However, such a method complicates both the structure of the shift valves and the control process.

SUMMARY OF THE INVENTION

The present invention has been made in an effort to solve the above problems. It is an object of the present invention to provide a hydraulic control system used in an automatic transmission for a vehicle, which easily and accurately controls timing of pressure supply to, and reduces a change in hydraulic pressure levels flowing in, a flow path. Further, it is another object of the present invention to provide a hydraulic control system which improves shift response when skip shifting, and, in particular, when up or downshifting into a third speed, the hydraulic control system accurately controlling operating timing of corresponding friction elements by control of a transmission control unit.

To achieve the above object, the present invention provides a hydraulic control system for an automatic transmission including a plurality of friction elements associated with respective transmission speeds, the hydraulic control system comprising:

a hydraulic fluid source;

line pressure control means for regulating hydraulic pressure from the fluid source to line pressure;

reducing pressure control means for reducing hydraulic pressure from the line pressure control means;

range control means for selectively supplying hydraulic pressure from the line pressure control means;

shift control means for supplying hydraulic pressure from the range control means to lines corresponding to respective shift ranges by control of a transmission control unit;

hydraulic pressure control means for duty controlling hydraulic pressure, supplied from the range control means, to convert the duty-controlled hydraulic pressure into control pressure for operating the friction elements; and hydraulic pressure distributing means for determining a hydraulic flow path corresponding to each shift range by operating valves according to the hydraulic pressure from the shift control means, and suitably distributing the hydraulic pressure from the shift control means or the control pressure to each of the friction elements;

wherein the hydraulic pressure distributing means comprises:

a 3-4 shift valve for realizing port conversion during 3-4 shifting to selectively supply/exhaust the control pressure to/from at least one of the friction elements corresponding to the respective transmission speeds;

a 2-3/4-3 shift valve for realizing port conversion during 2-3 or 4-3 shifting to selectively supply/exhaust the control pressure to/from at least one of the friction elements corresponding to the respective transmission speeds;

a 4-2 shift valve for realizing port conversion during 4-2 skip-shifting to selectively supply/exhaust the control pressure to/from at least one of the friction elements corresponding to the respective transmission speeds;

a 1-2 shift valve for realizing port conversion during 1-2 shifting to selectively supply/exhaust the control pressure to/from the 2-3/4-3 shift valve and 4-2 shift valve in accordance with the respective transmission speeds and to selectively supply/exhaust hydraulic pressure from the range control means to at least one of the friction elements corresponding to the respective transmission speeds;

a control switch valve for realizing port conversion to selectively supply/exhaust hydraulic pressure from the shift control means and the control pressure via the 1-2 shift valve to at least one of the friction elements corresponding to the respective transmission speeds such that accurately controls timing when each corresponding friction element begins to operate; and a solenoid valve for controlling the control switch valve in accordance with a control signal of the transmission control unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Preferred embodiments of the present invention will now be described in detail with reference to the accompanying drawings.

Certain terminology will be used in the following description for convenience and reference only and will not be limiting. The words "right" and "left" are only used to designate directions in the drawings to which reference is made.

Figure 1:
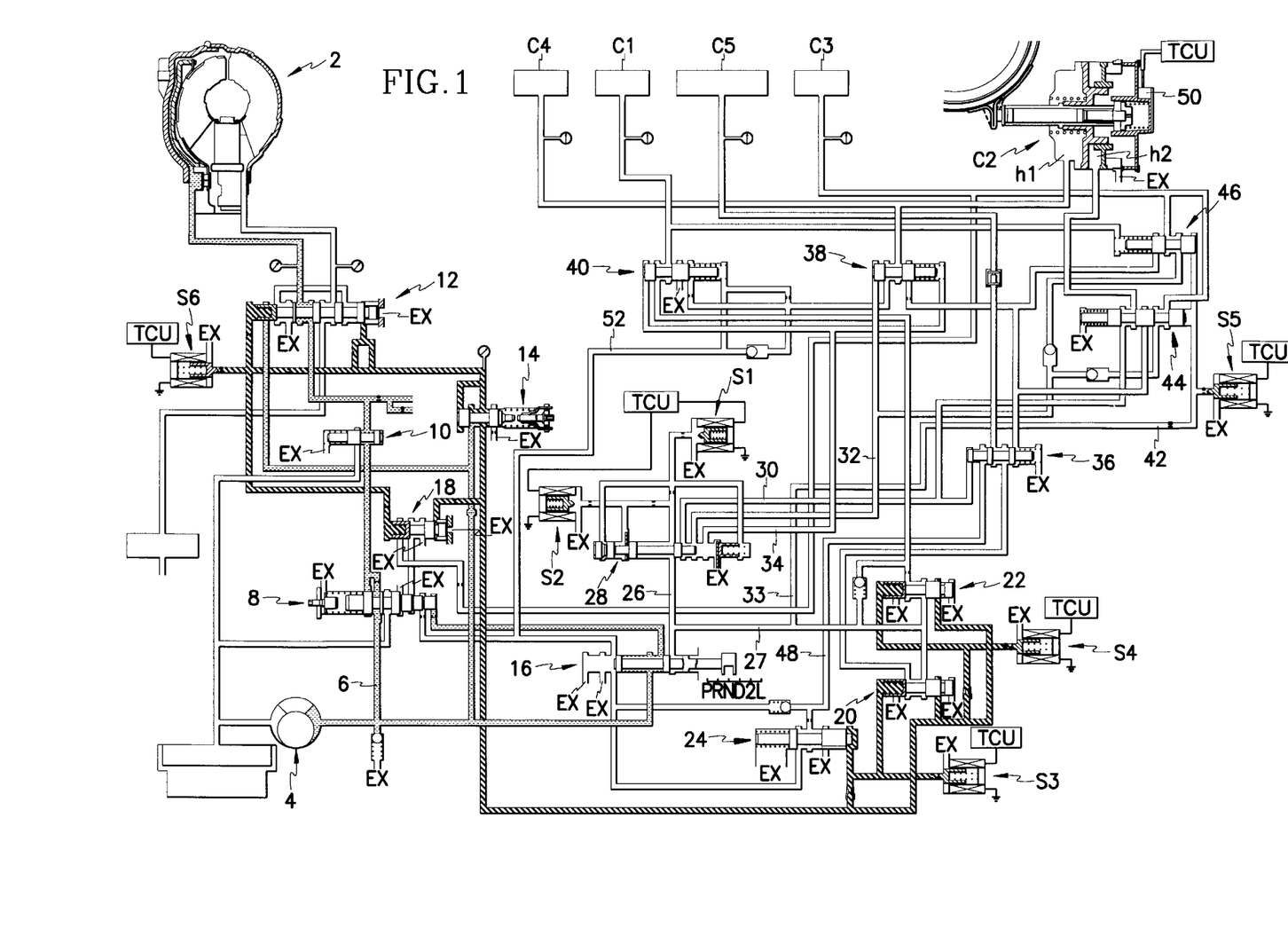
FIG. 1 is a hydraulic circuit diagram showing hydraulic pressure flow in a neutral N range of a hydraulic control system according to a preferred embodiment of the present invention.

Referring first to FIG. 1, there is shown a hydraulic circuit diagram showing hydraulic pressure flow in a neutral N range of a hydraulic control system according to the present invention. The hydraulic control system is structured such that hydraulic pressure created by hydraulic pressure generating means is supplied to/released from each friction element to engage/disengage the same, realizing automatic shifting.

In more detail, an hydraulic pump 4, mounted to a pump drive hub of a torque converter 2, is connected to a line pressure passage 6 to enable supply of hydraulic pressure to a pressure regulating valve 8.

The pressure regulating valve 8 supplies hydraulic pressure supplied through the line pressure passage 6 to a torque converter control valve 10, a damper clutch control valve 12, and the torque converter 2 such that lubrication of a transaxle and a damper clutch, mounted in the torque converter 2, are able to be controlled.

Part of the hydraulic pressure supplied from the hydraulic pump 4 is supplied to a reducing valve 14, which reduces line pressure, and to a manual valve 16, indexed by a selector lever (not shown) operated by the driver to determine shift ranges by controlling hydraulic flow.

Part of the hydraulic pressure reduced by the reducing valve 14 is supplied to a high-low pressure valve 18, which minimizes power loss of the hydraulic pump 4 by reducing line pressure in a high speed stage, to control the same valve 18. Further, part of the reduced hydraulic pressure is supplied to first and second pressure control valves 20 and 22 to control the same, the first and second pressure control valves 20 and 22 being comprised in a hydraulic pressure controller. Further, another part of the reduced hydraulic pressure is supplied to a N-R control valve 24 which reduces shift shock when changing shift modes from the neutral N range to a reverse R range.

When the manual valve 16, which is a range controller, is positioned at a drive D range, hydraulic pressure from the manual valve 16 flows into a line 26. The line 26 is connected to a shift control valve 28 which determines the hydraulic flow path by port conversion according to control of the first and second solenoid valves S1 and S2, ON/OFF controlled by a transmission control unit (TCU), the manual valve 16 being comprised in a range controller and the shift control valve 28 and the solenoid valves S1 and S2 being comprised in a shift controller.

The shift control valve 28 is connected to a second speed line 30, a third speed line 32, and a fourth speed line 34 to control valve spools of spool valves being comprised in a hydraulic pressure distributor.

In more detail, hydraulic pressure in the second speed line 30 is supplied to a left side port of a 1-2 shift valve 36 to control a valve spool of the same, hydraulic pressure in the third speed line 32 is supplied to a left side port of a 2-3/4-3 shift valve 38 to control a valve spool of the same, and hydraulic pressure in the fourth line 34 is supplied to a right side port of the 2-3/4-3 shift valve 38 and a left side port of a 3-4 shift valve 40 to control valve spools of the same valves 38 and 40.

Meanwhile, the first and second pressure control valves 20 and 22 realize port conversion in accordance with the third and fourth solenoid valves S3 and S4, respectively.

The line 26 connected to the manual valve 29 is branched off to a first speed line 27. Accordingly, hydraulic pressure is supplied to the first and second pressure control valves 20 and 22, which duty-control the hydraulic pressure into control pressure, such that the control pressure is supplied to a first friction element C1, acting as an input element in the first speed stage, via the 3-4 shift valve controlled by the third and fourth solenoid valves S3 and S4.

Further, the first speed line 40 is connected to a timing control line 42 such that line pressure in the first speed line 40 is supplied to a control switch valve 44 and a 4-2 shift valve 46.

The control switch valve 44 supplies/exhausts operational pressure to/from a third friction element C3, which acts as an input element in the third and fourth speed stages, and controls a timing of when the operational pressure is supplied to the third friction element C3. Further, the control switch valve 44 controls an operating timing of a second friction element C2, which acts as a reaction element in the second and fourth speed stages. The above timing control is realized through port conversion of the control switch valve 44 according to control of a fifth solenoid valve S5, the fifth solenoid valve S5 being ON/OFF controlled by the TCU.

The control switch valve 44 comprises a first port receiving hydraulic pressure from the manual valve 16 to control a valve spool of the control switch valve 44, a second port receiving line pressure through the third speed line 32, a third port receiving hydraulic pressure from the first pressure control valve 20 via the 1-2 shift valve, a fourth port receiving line pressure through the second speed line 30, a fifth port supplying hydraulic pressure supplied through the fourth port to an operational chamber h2 of the second friction element C2, and a sixth port supplying hydraulic pressure supplied through the second port to the third friction element C3. A valve spool of the control switch valve 44 is operated by a fifth solenoid valve S5, connected to the first port, such that hydraulic pressure supplied through the third port is selectively supplied to the operational chamber h2 through the fifth port or to the third friction element C3 through the sixth port.

The 4-2 shift valve 46 comprises a port connected to the first port of the control switch valve 44, a port receiving the third speed pressure in the third speed line 32, a port receiving hydraulic pressure from the first pressure control valve 20 via the 1-2 shift valve 36, a port supplying hydraulic pressure to the third friction element C3, and a port connected to the 3-4 shift valve 40.

A valve spool of the 4-2 shift valve 46 is controlled by both the hydraulic pressure supplied through the port connected to the first port of the control switch valve 44 and the hydraulic pressure supplied through the port connected to the 3-4 shift valve 40. By the this control, the 4-2 shift valve 46 more accurately controls operating timing of the third friction element C3.

The 1-2 shift valve 36 supplies control pressure from the first pressure control valve 20 to the operational chamber h2 via the control switch valve 44. Simultaneously, the 1-2 shift valve 36 supplies the control pressure from first pressure control valve 20 to the fourth friction element C4 and a release chamber hi of the second friction element C2 via a 2-3/4-3 shift valve 38.

For the above operation, the 1-2 shift valve 36 comprises a port receiving line pressure from the shift control valve 28 through the second speed line 30 to control a valve spool of the 1-2 shift valve 36 in second, third, and fourth speed states, a port receiving reverse control pressure through a reverse control line 48 when in the reverse R range, a port receiving control pressure from the first pressure control valve 20, a port through which the reverse range pressure is supplied to the fifth friction element C5, and a port through which the hydraulic pressure supplied from the first pressure control valve 20 is supplied to the 2-3/4-3 shift valve 38, the 4-2 shift valve 46, and the control switch valve 44 in the drive D range.

On a side of the operational chamber h2 of the second friction element C2 is provided a kickdown switch 50. The kickdown switch 50 detects whether or not the second friction element C2 is operating and transmits a corresponding signal to the TCU.

The 3-4 shift valve 40 supplies control pressure from the second pressure control valve 22 to the first friction element C1 in the first, second, and third speeds. Further, the control pressure supplied to the first friction element C1 is exhausted through the 3-4 shift valve 40 during 3-4 shifting.

The hydraulic pressure supplied to the release chamber h1 of the second friction element C2 is returned through a second reverse control line 52 via the 2-3/4-3 shift valve 38 or the 3-4 shift valve 40 to be exhausted through an exit port of the manual valve 16.

Reference numeral S6, which has not yet been described, is a sixth solenoid valve. The sixth solenoid valve S6 controls the damper clutch control valve 12 according to a control signal of the TCU.

The flow of hydraulic pressure and shift processes for each shift stage in the hydraulic control system structured as in the above will now be described with reference with the accompanying drawings.

When in the neutral N range as shown in FIG. 1, hydraulic pressure from the hydraulic pump 4 is regulated to a predetermined level by the pressure regulating valve 8 and reduced by the reducing valve 14 to be supplied to the first and second pressure control valves 20 and 22, and to the damper clutch control valve 12. Here, the third and fourth solenoid valves S3 and S4 are duty-controlled to OFF by the TCU such that the valve spools of the pressure control valves 20 and 22 move to the right.

Figure 2:
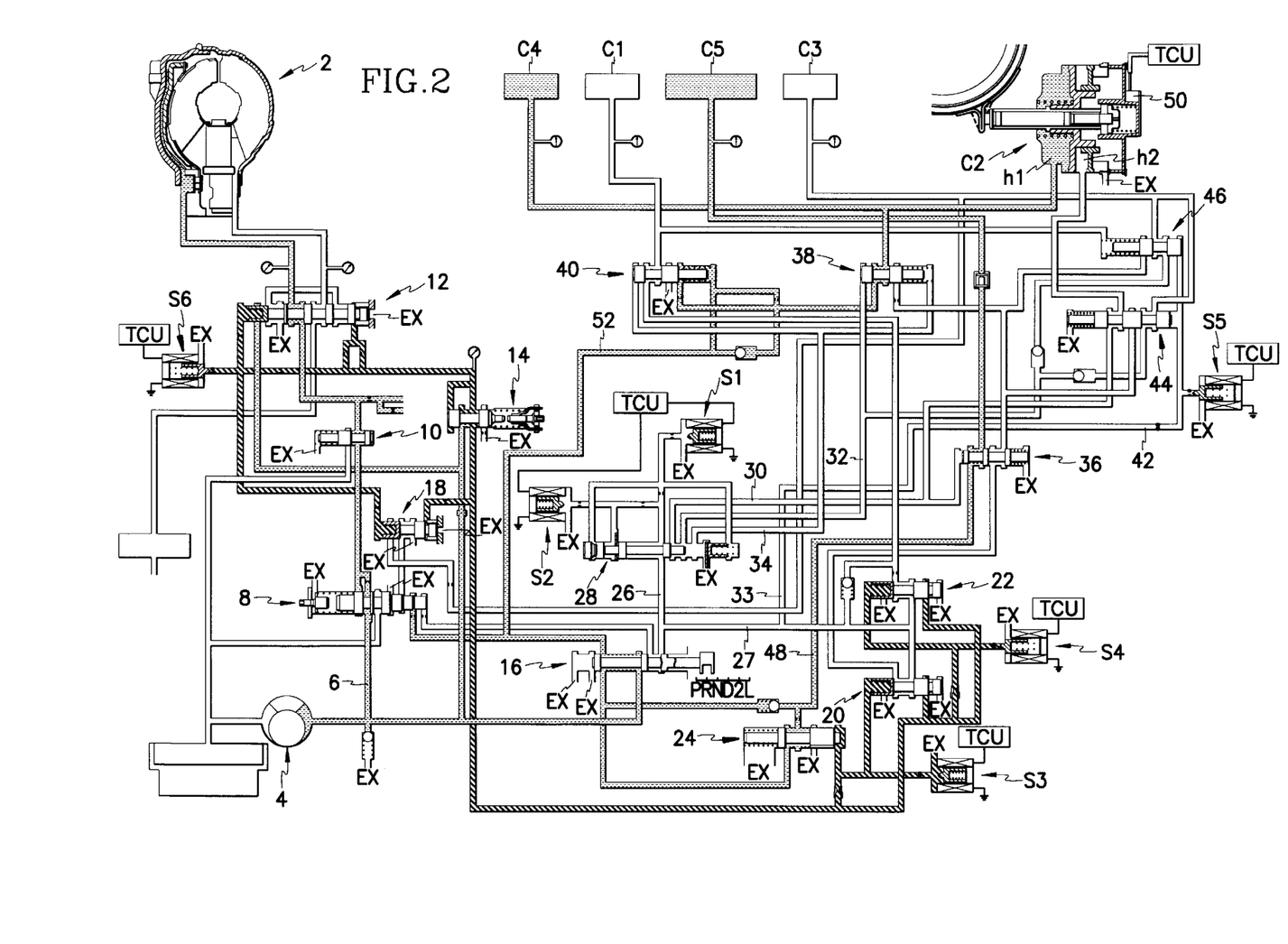
FIG. 2 is a hydraulic circuit diagram showing hydraulic pressure flow in a reverse R range of a hydraulic control system according to a preferred embodiment of the present invention.

From the above state, when the manual valve 16 is positioned in the reverse R range, as shown in FIG. 2, part of the hydraulic pressure being supplied to the manual valve 16 is supplied to the 1-2 shift valve 36 through the first reverse control line 48 via the N-R control valve 24 duty-controlled by the third solenoid valve S4. Accordingly, the valve spool of the 1-2 shift valve 36 moves to the right such that the hydraulic pressure is supplied to the fifth friction element C5 acting as a reaction element at the reverse R range. Also, part of the hydraulic pressure from the manual valve 16 is supplied to the fourth friction element C4, which acts as an input element in the reverse R range, through the second reverse control line 52 via the 3-4 shift valve 40 and the 2-3/4-3 shift valve 38 to realize shifting into the reverse R range.

Figure 3:
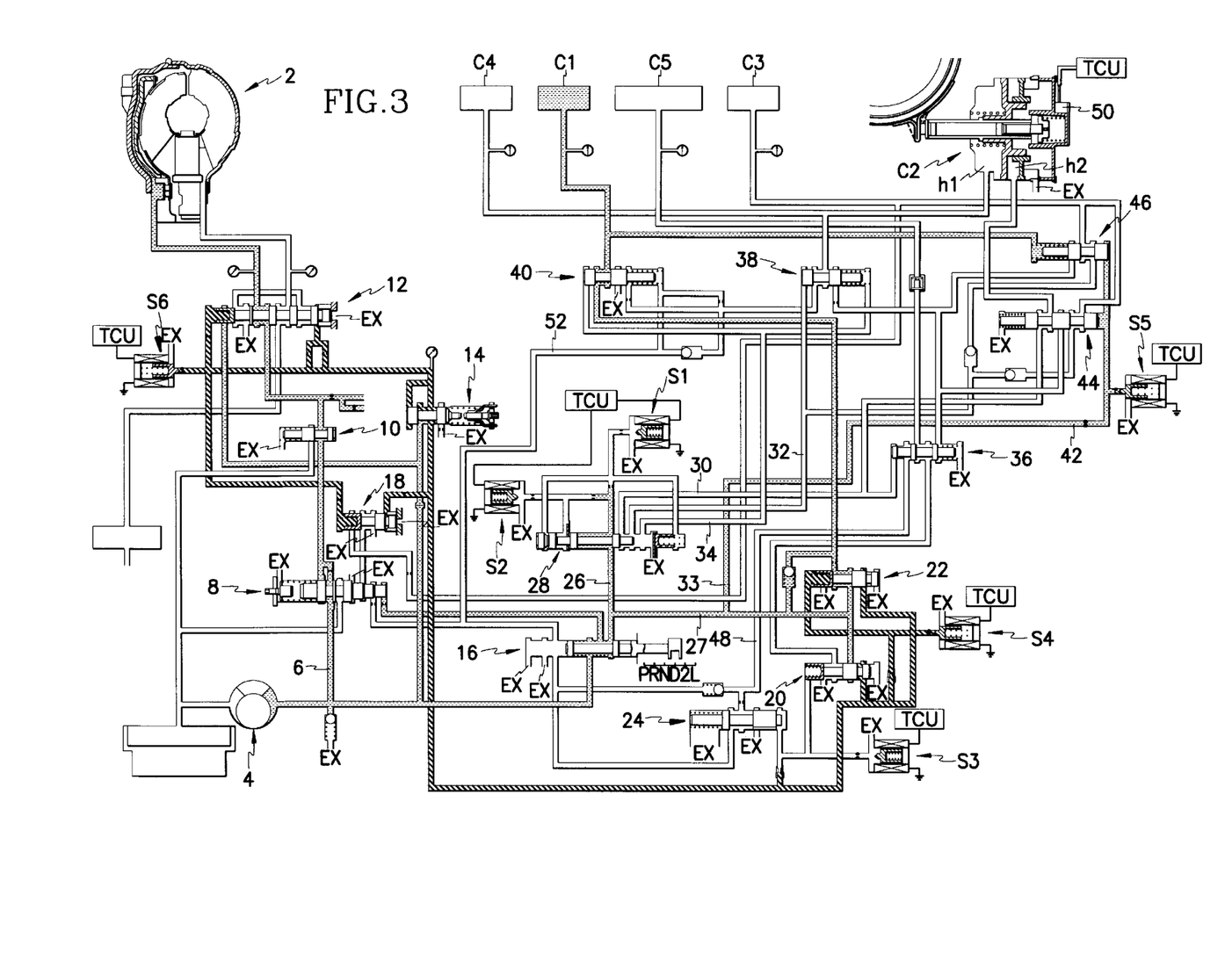
FIG. 3 is a hydraulic circuit diagram showing hydraulic pressure flow in a first speed of a drive D range of a hydraulic control system according to a preferred embodiment of the present invention.

If the manual valve 16 is positioned in the drive D range from the neutral N range, as shown in FIG. 3, part of the hydraulic pressure being supplied from the manual valve 16 is supplied to the first and second pressure control valves 20 and 22, and to the shift control valve 28. Here, the first and second solenoid valve S1 and S2 are controlled to ON such that the valve spool of the shift control valve 28 is positioned identically as that in the neutral N range.

Further, in this state, the third solenoid valve S3 is controlled to ON such that the hydraulic pressure is not able to be supplied to the first pressure control valve 20. Thus, the hydraulic pressure passes through the second pressure control valve 22 to be supplied to the first friction element C1, which acts as an input element in the first speed stage of the drive D range, through the 3-4 shift valve 40.

Here, through the line 42 branched off from the first speed line 27, part of the hydraulic pressure is supplied to the first port of the control switch valve 44 to push the valve spool of the same to the left.

Figure 4:
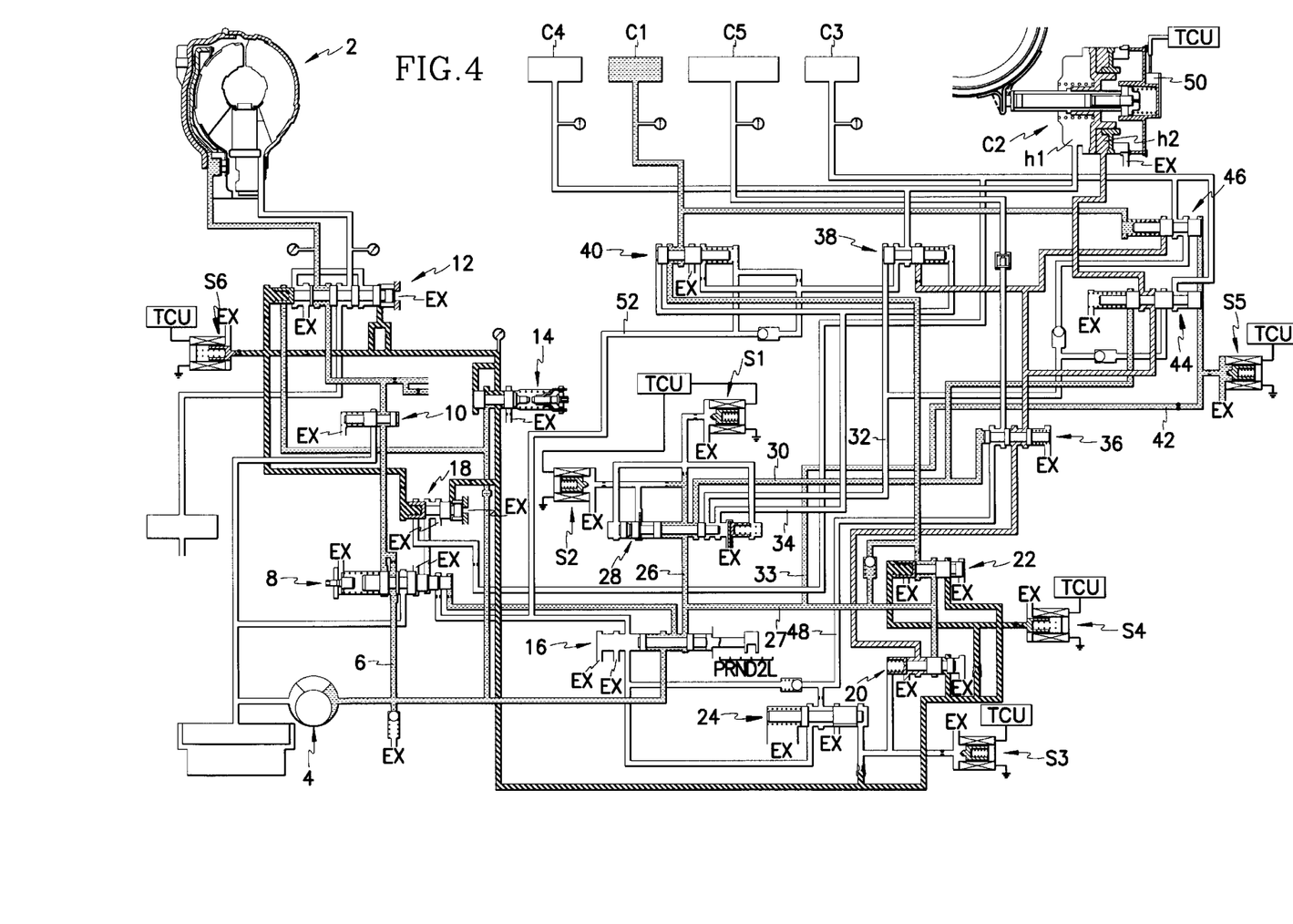
FIG. 4 is a hydraulic circuit diagram showing hydraulic pressure flow during 1-2 upshifting in the drive D range of a hydraulic control system according to a preferred embodiment of the present invention.

If throttle opening and vehicle speed are increased in the first speed state, the TCU controls the first solenoid valve S1 to OFF from ON such that the shift control valve 28 supplies the hydraulic pressure supplied from the manual valve 16 to the second speed line 30, as shown in FIG. 4. Also, the third solenoid valve S3 is duty-controlled to OFF such that hydraulic pressure in the first speed line 40 is supplied to the operational chamber h2 of the second friction element C2 via the 1-2 shift valve 36 or the control switch valve 44.

Here, part of hydraulic pressure passing the 1-2 shift valve 36 is supplied to the 2-3/4-3 shift valve 38 and the 4-2 shift valve 46 to stand by at these valves 38 and 46. Further, part of hydraulic pressure in the second speed line 30 is supplied to the control switch valve 44 through a line branched from the second speed line 30 and stands by at the control switch valve 44.

Figure 5:
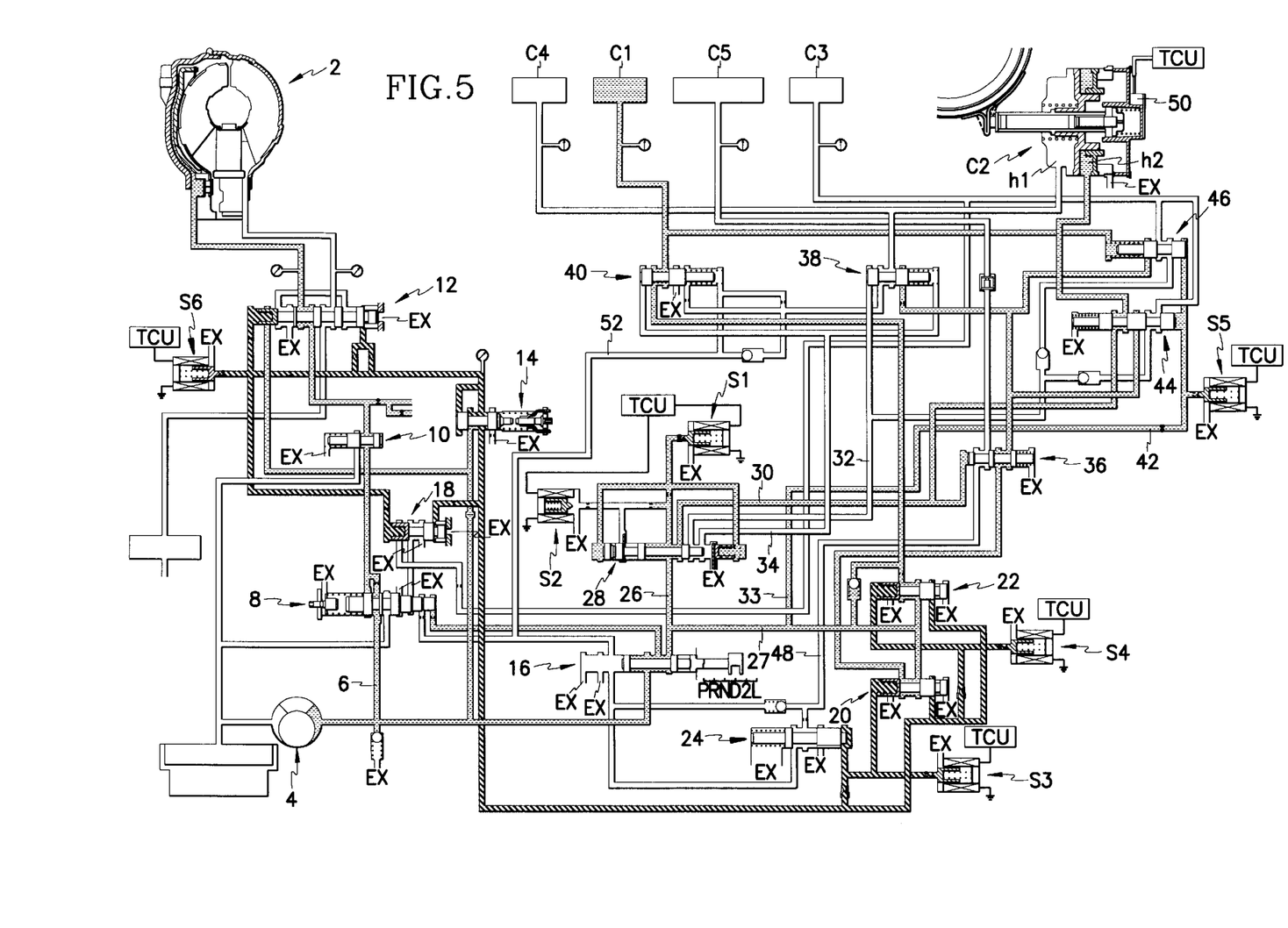
FIG. 5 is a hydraulic circuit diagram showing hydraulic pressure flow in a second speed of the drive D range of a hydraulic control system according to a preferred embodiment of the present invention.

In this state, if the third and fifth solenoid valve S3 and S5 are controlled to OFF, as shown in FIG. 5, the valve spool of the control switch valve 44 moves to the left such that the second speed line 30 is communicated with the operational chamber h2 of the second friction element C2 to realize shifting into the second speed of the drive D range.

Figure 6:
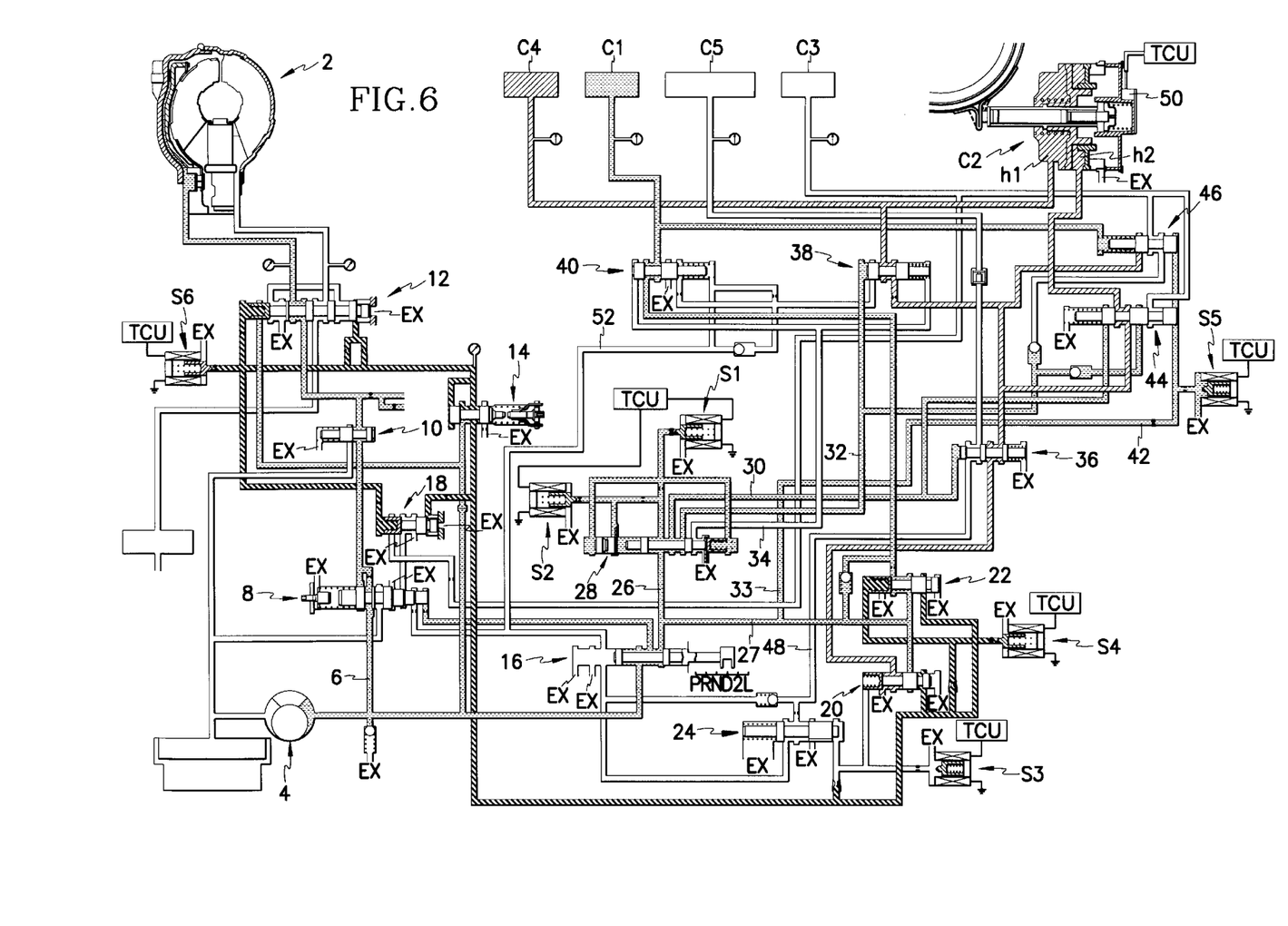
FIG. 6 is a hydraulic circuit diagram showing hydraulic pressure flow during 2-3 upshifting in the drive D range of a hydraulic control system according to a preferred embodiment of the present invention.

If vehicle speed and throttle opening are increased in the above state, the first and second solenoid valves S1 and S2 are controlled to OFF as shown in FIG. 6. By this control, hydraulic fluid flows into the second speed line 30 and the third speed line 32. Thus, line pressure in the third speed line 32 is supplied to a left side port of the 2-3/4-3 shift valve 38 such that the valve spool of the same moves to the right.

Accordingly, the hydraulic pressure standing by at the 2-3/4-3 shift valve 38 in the second speed is supplied to the release chamber h1 of the second friction element C2 to stop the operation of the same and, simultaneously, the hydraulic pressure is supplied to the fourth friction element C4.

Also at the same time, the fifth solenoid valve S5 is controlled to ON such that the hydraulic pressure being supplied to the operational chamber h2 of the second friction element C2 via the 1-2 shift valve 36 is converted into control pressure from line pressure in the second speed line 30, which the second and third speed pressures stands by at the control switch valve 44.

Figure 7:
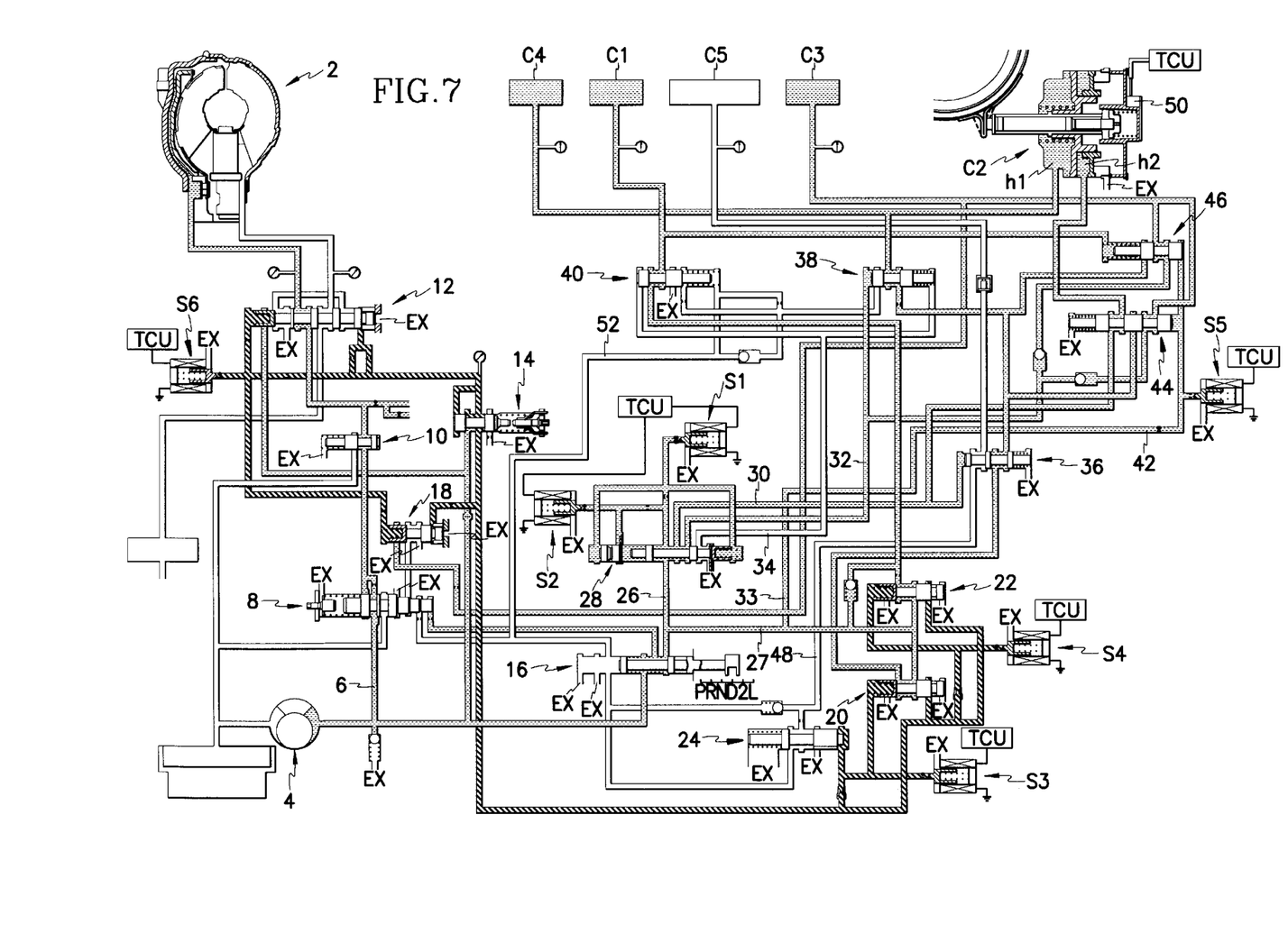
FIG. 7 is a hydraulic circuit diagram showing hydraulic pressure flow in a third speed of the drive D range of a hydraulic control system according to a preferred embodiment of the present invention.

In this state, if the fifth solenoid valve S5 is controlled to OFF from ON as shown in FIG. 7, the valve spool of the control switch valve 44 moves to the left such that the hydraulic pressure being supplied to the operational chamber h2 of the second friction element C2 is converted back into line pressure in the second speed line 30. Further, the line pressure in the third speed line 32 is supplied to the third friction element C3 to realize shifting into the third speed of the drive D range.

Here, part of the hydraulic pressure being supplied to the third friction element C3 is supplied to the high/low pressure valve 18 such that the pressure regulating valve 8 is controlled to reduce line pressure. The reduction of line pressure reduces power loss of the hydraulic pump 4.

As described above, when shifting into the fourth speed from the third speed, because the fifth solenoid valve S5 controls the third friction element C3, the problem of shifting temporarily into the neutral N range is prevented.

Figure 8:
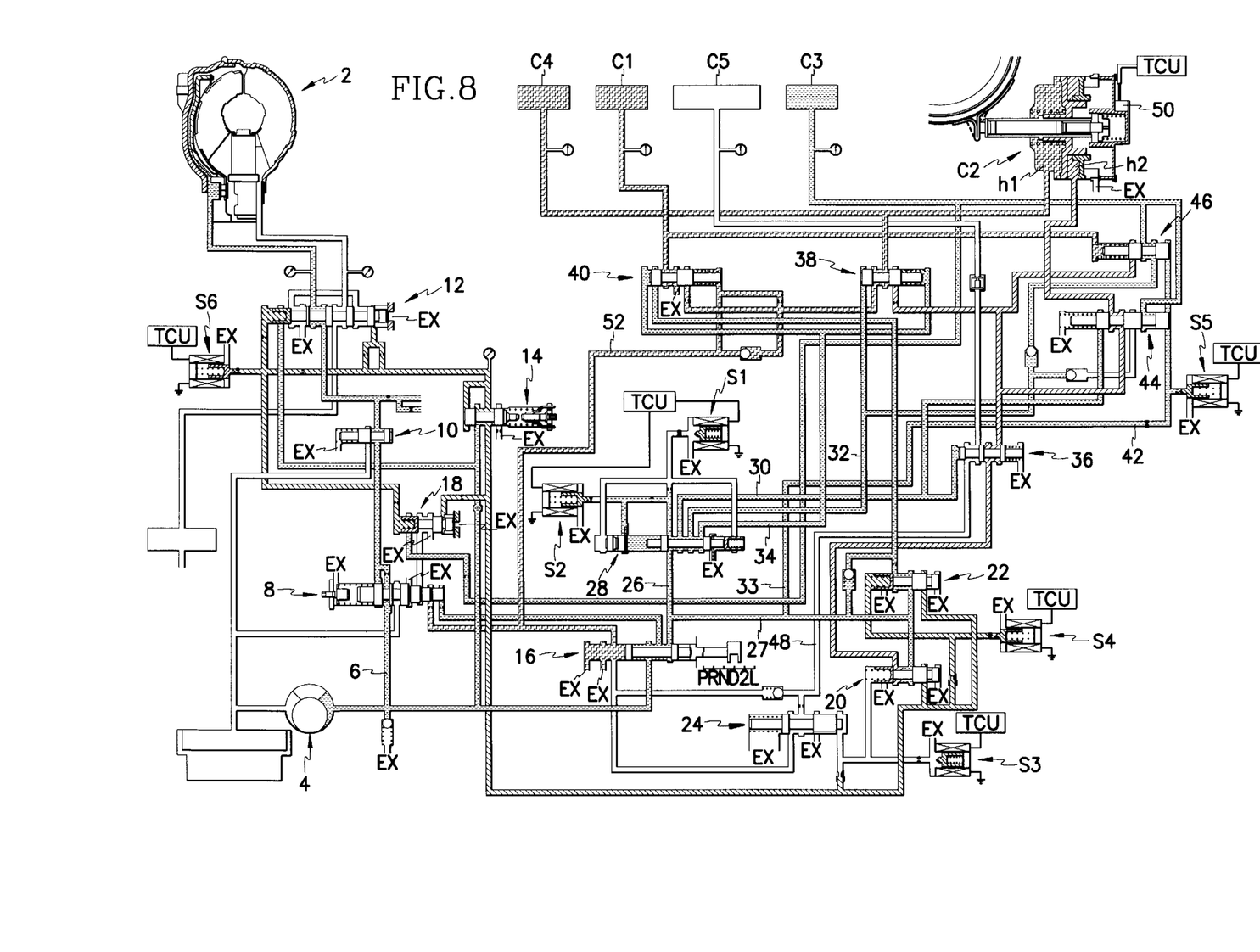
FIG. 8 is a hydraulic circuit diagram showing hydraulic pressure flow during 3-4 upshifting in the drive D range of a hydraulic control system according to a preferred embodiment of the present invention.

If vehicle speed and throttle opening are increased in the third speed state, as shown in FIG. 8, the TCU controls the first and fifth solenoid valves S1 and S5 to ON such that hydraulic fluid flows in the second, third, and fourth speed lines 30, 32, and 34. Further, the third solenoid valve S3 is duty-controlled.

Accordingly, the hydraulic pressure being supplied to the operational chamber h2 of the second friction element C2 is converted into control pressure from the 1-2 shift valve 36 from line pressure in the second pressure line 32. Further, line pressure in the fourth speed line 34 is supplied to the left side port of the 3-4 shift valve 40 and the right side port of the 2-3/4-3 shift valve 38 such that the valve spool of the 3-4 shift valve 40 moves to the right and the valve spool of the 2-3/4-3 shift valve 38 moves to the left.

Consequently, the hydraulic pressure in the first friction element C1 is exhausted through an exit port Ex of the 3-4 shift valve 40. Further, because hydraulic pressure is supplied to the operational chamber h2 of the second friction element C2 to press a wall of the release chamber h1 to the left, the hydraulic pressure in the release chamber h1 is quickly exhausted through an exit port Ex of the manual valve 16 via the 2-3/4-3 shift valve 38, 3-4 shift valve 40, and the second reverse control line 52.

Figure 9:
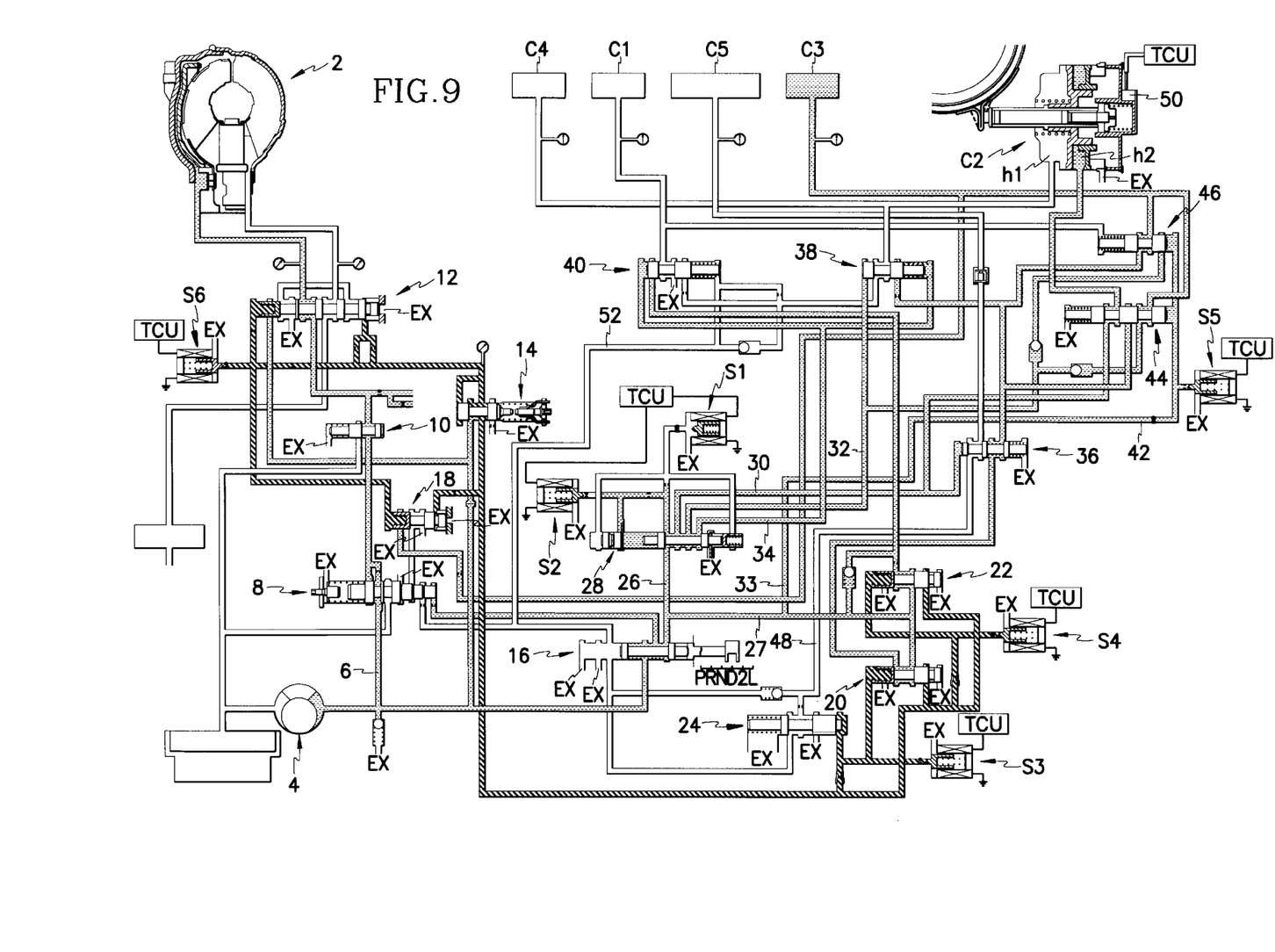
FIG. 9 is a hydraulic circuit diagram showing hydraulic pressure flow in a fourth speed of the drive D range of a hydraulic control system according to a preferred embodiment of the present invention.

After completing the above control process, the valve spool of the control switch valve 44 moves to the left by OFF-control of the fifth solenoid valve S5 such that line pressure in the third speed line 34 is supplied to the operational chamber h2 of the second friction element C2 via the control switch valve 44 to realize shifting into the fourth speed of the drive D range.

Figure 10:
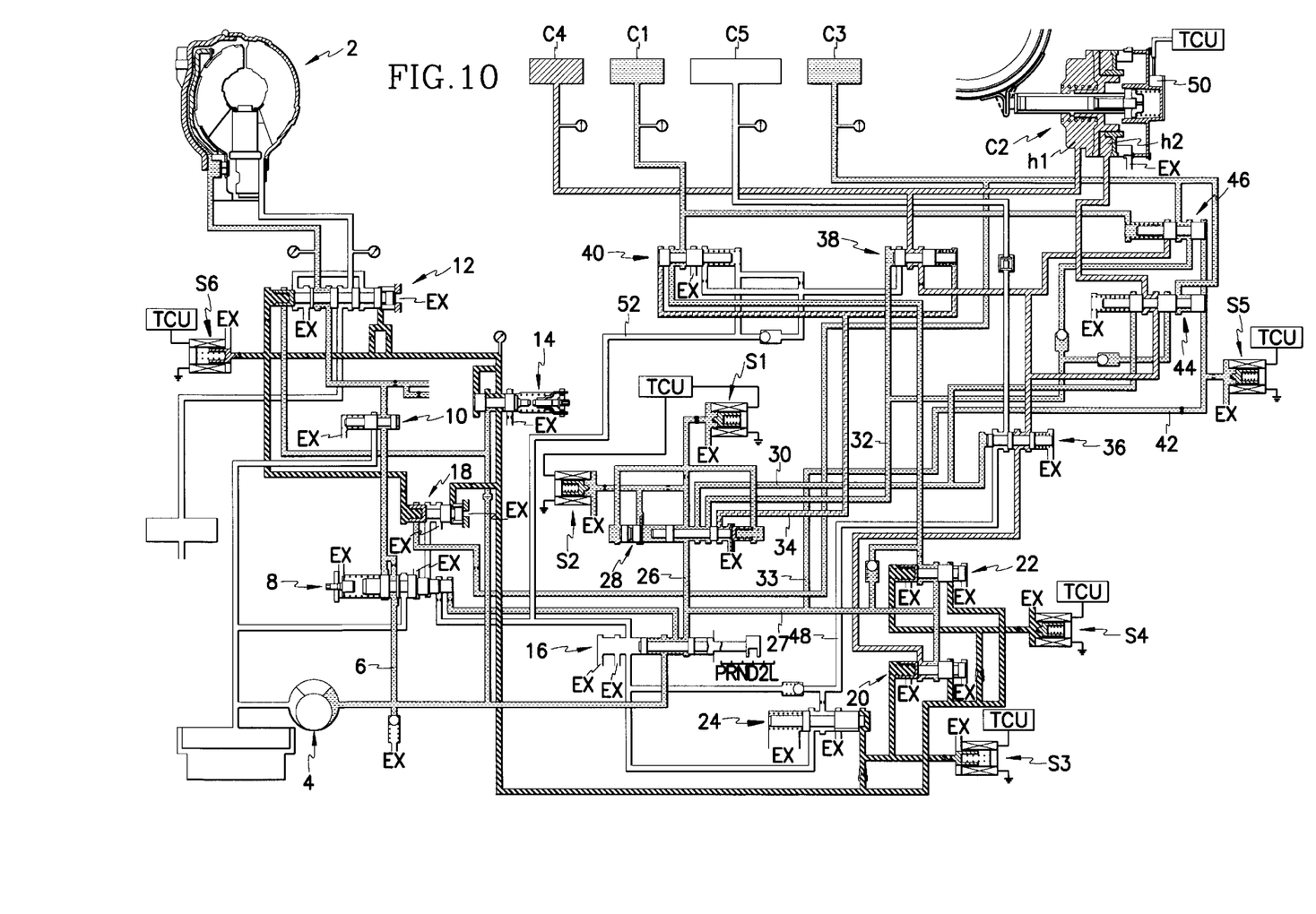
FIG. 10 is a hydraulic circuit diagram showing hydraulic pressure flow during 4-3 downshifting in the drive D range of a hydraulic control system according to a preferred embodiment of the present invention.

When downshifting into the third speed state from the fourth speed state, the first solenoid valve S1 is controlled to OFF as shown in FIG. 10 such that line pressure in the fourth speed line 34 is exhausted. Accordingly, the valve spool of the 2-3/4-3 shift valve 38 moves to the right and the valve spool of the 3-4 shift valve 40 moves to the left.

Further, by duty-control of the third and fourth solenoid valves S3 and S4, control pressure regulated by the first pressure control valve 20 is supplied to the fourth friction element C4, and to the operational and release chambers h2 and h1 of the second friction element C2 via the 1-2 shift valve, the control switch valve 44, and the 2-3/4-3 shift valve 38. Here, hydraulic pressure applied to the release chamber h1 and the fourth friction element C4 are affected by hydraulic pressure applied to the operational chamber h2. The second pressure control valve 22 duty-controls and supplies hydraulic pressure to the first friction element C1 to realize shifting into the third speed state from the fourth speed state. Consequently, shift shock is reduced and shifting temporarily into the neutral N range is prevented.

Figure 11:
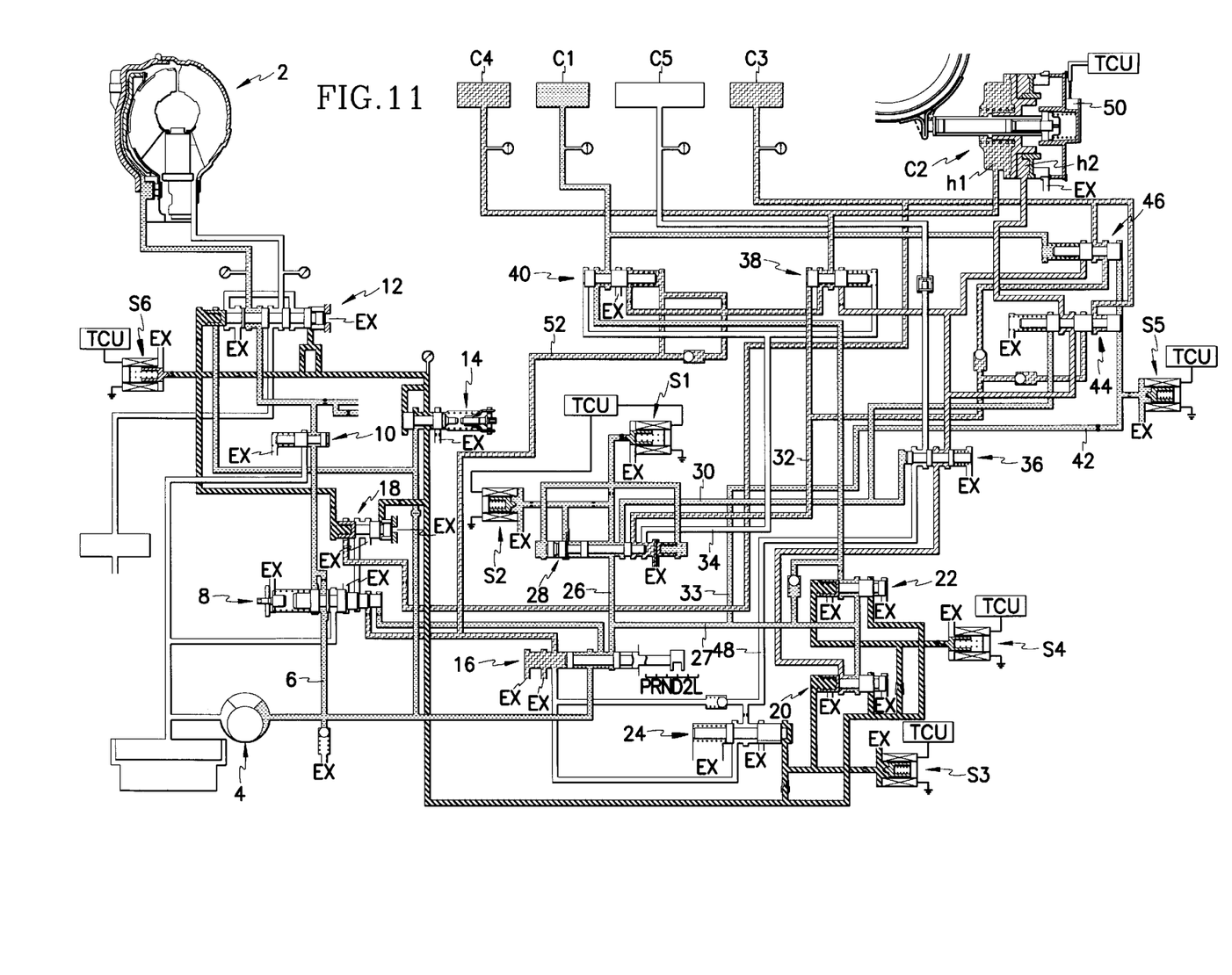
FIG. 11 is a hydraulic circuit diagram showing hydraulic pressure flow during 3-2 downshifting in the drive D range of a hydraulic control system according to a preferred embodiment of the present invention.

When downshifting into the second speed state from the third speed state as shown in FIG. 11, the second solenoid valve S2 is controlled to OFF such that the hydraulic pressure in the third friction element C3 is quickly exhausted through the shift control valve 26 via the third speed line 32. Further, by duty-control of the third solenoid valve S3, hydraulic pressure being supplied to the operational chamber h2 of the second friction element C2 through the control switch valve 44 is converted into control pressure from the 1-2 shift valve 36. Because the operational chamber h2 of the second friction element C2 receives hydraulic pressure, the wall of the release chamber h1 is pushed leftward such that hydraulic pressures in the release chamber h1 and the fourth friction element C4 are exhausted through the manual valve 16 via the 2-3/4-3 shift valve 38, the 3-4 shift valve 40, and the second reverse control line 52.

Figure 12:
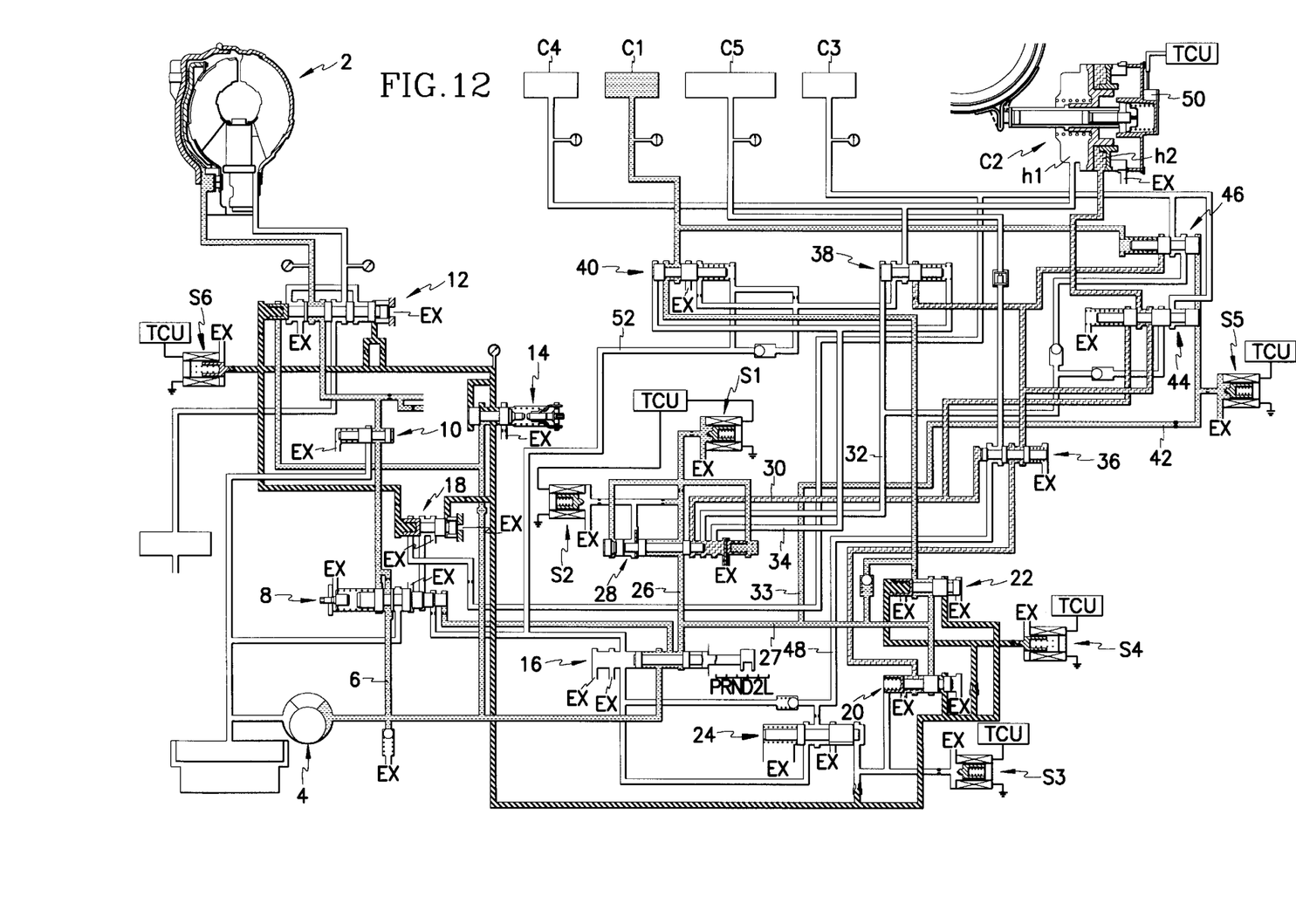
FIG. 12 is a hydraulic circuit diagram showing hydraulic pressure flow during 2-1 downshifting in the drive D range of a hydraulic control system according to a preferred embodiment of the present invention.

When downshifting into the first speed state from the second speed state as shown in FIG. 12, the first solenoid valve S1 is maintained in an OFF state and the second solenoid valve S2 is switched ON. Further, the fifth solenoid valve S5 is initially controlled to ON then returned to OFF at the end of shifting.

Accordingly, line pressure in the second speed line 30 is quickly exhausted through the exit port Ex of the shift control valve 28 and the hydraulic pressure in the operational chamber h2 of the second friction element C2 is exhausted by duty-control of the third solenoid valve S3.

Figure 13:
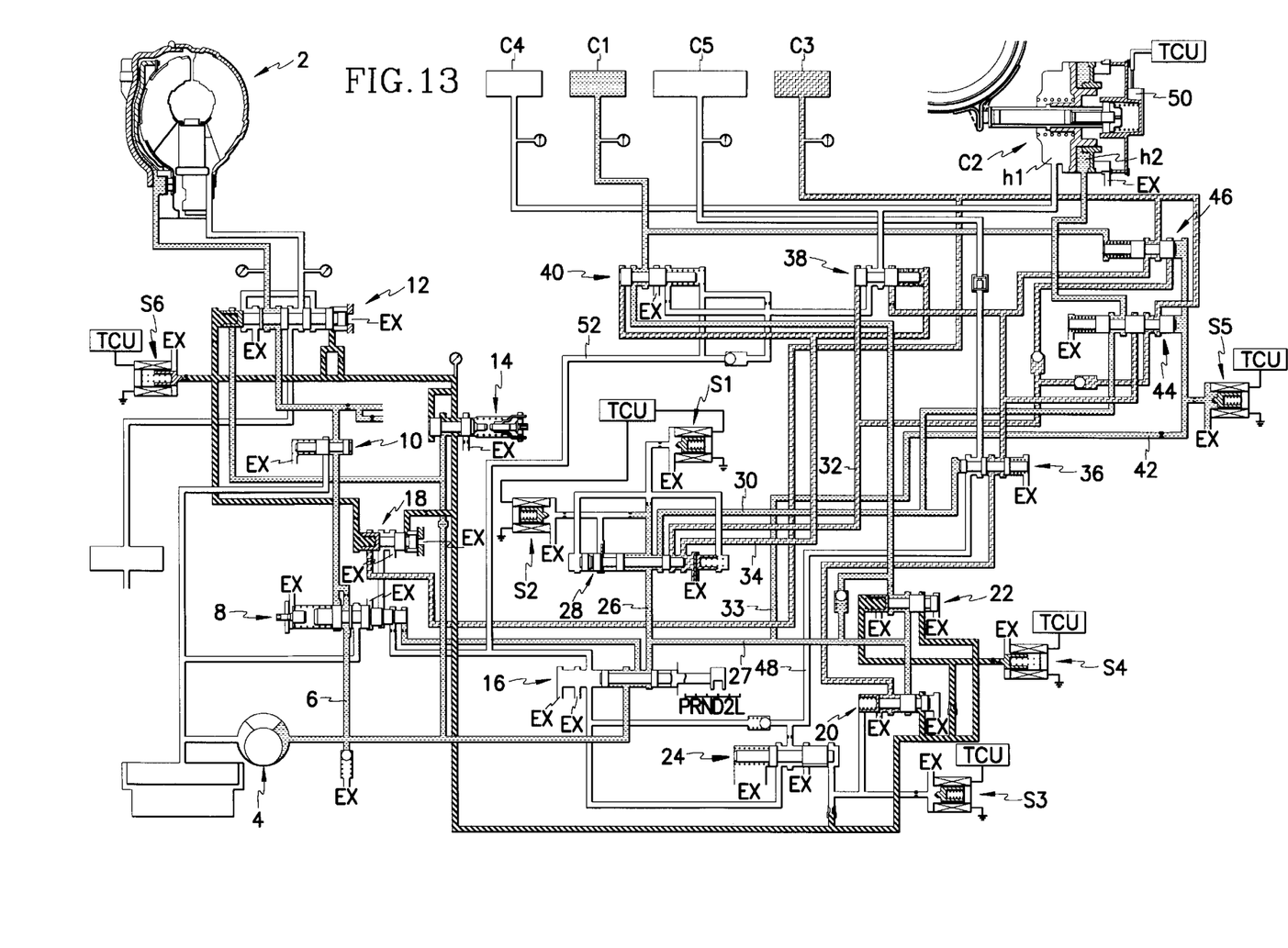
FIG. 13 is a hydraulic circuit diagram showing hydraulic pressure flow during 4-2 skip-shifting in the drive D range of a hydraulic control system according to a preferred embodiment of the present invention.

The hydraulic control system according to the present invention is able to realize 4-2 kickdown skip shifting. If the TCU transmits a 4-2 kickdown skip shift signal, the first solenoid valve S1 is controlled to OFF from ON and the second solenoid valve S2 is controlled to ON from OFF, as shown in FIG. 13. Also, the fifth solenoid valve S5 is initially controlled to ON then controlled to OFF at the end of shifting.

The third and fourth solenoid valves S3 and S4 are duty-controlled such that the hydraulic pressure in the third friction element C3 is exhausted, while hydraulic pressure is supplied to the first friction element C1 to realize skip shifting into the second speed state.

As described in the above when up or downshifting, in the hydraulic control system according to the present invention, the fifth solenoid valve S5 is controlled to ON at the middle of the shifting process such that the control switch valve 44 supplies control pressure, duty-controlled by the first pressure control valve 20, to the operational chamber h2 of the second friction element C2, and, at the end of the shifting process, the fifth solenoid valve S5 is controlled to OFF such that the switch control valve 44 supplies line pressure in the second speed line 30 to the operational chamber h2. Accordingly, shift shock and damage to friction elements is greatly reduced and shift quality is improved.

Further, when 3-4 or 3-2 shifting, because hydraulic pressures in the first and third friction elements C1 and C3 are quickly exhausted and hydraulic pressures exhausted from the release chamber h1 and the fourth friction element C4 are controlled by of hydraulic pressure supplied to the operational chamber h2 of the second friction element C2, shift shock is reduced and the temporary shifting into the neutral state is prevented. In addition, 4-2 skip shifting is able to be realized. Accordingly, shift response and durability of the automatic transmission are improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission including a plurality of friction elements associated with respective transmission speeds, the hydraulic control system comprising:

a hydraulic fluid source;

line pressure control means for regulating hydraulic pressure from the fluid source to line pressure;

reducing pressure control means for reducing hydraulic pressure from the line pressure control means;

range control means for selectively supplying hydraulic pressure from the line pressure control means;

shift control means for supplying hydraulic pressure from the range control means to lines corresponding to respective shift ranges by control of a transmission control unit;

hydraulic pressure control means for dutycontrolling hydraulic pressure, supplied from the range control means, to convert the duty-controlled hydraulic pressure into control pressure for operating the friction elements; and hydraulic pressure distributing means for determining a hydraulic flow path corresponding to each shift range by operating valves according to the hydraulic pressure from the shift control means, and suitably distributing the hydraulic pressure from the shift control means or the control pressure to each of the friction elements;

wherein the hydraulic pressure distributing means comprises:

a 3-4 shift valve for realizing port conversion during 3-4 shifting to selectively supply/exhaust the control pressure to/from at least one of the friction elements corresponding to the respective transmission speeds;

a 2-3/4-3 shift valve for realizing port conversion during 2-3 or 4-3 shifting to selectively supply/exhaust the control pressure to/from at least one of the friction elements corresponding to the respective transmission speeds;

a 4-2 shift valve for realizing port conversion during 4-2 skip-shifting to selectively supply/exhaust the control pressure to/from at least one of the friction elements corresponding to the respective transmission speeds;

a 1-2 shift valve for realizing port conversion during 1-2 shifting to selectively supply/exhaust the control pressure to/from the 2-3/4-3 shift valve and the 4-2 shift valve in accordance with the respective transmission speeds, and to selectively supply/exhaust hydraulic pressure from the range control means to at least one of the friction elements corresponding to the respective transmission speeds;

a control switch valve for realizing port conversion to selectively supply/exhaust hydraulic pressure from the shift control means and the control pressure via the 1-2 shift valve to at least one of the friction elements corresponding to the respective transmission speeds such that timing of when each corresponding friction element begins to operate is accurately controlled; and a solenoid valve for controlling the control switch valve in accordance with a control signal of the transmission control unit.

2. The hydraulic control system of claim 1, wherein said 3-4 shift valve comprises:

a port connected to the range control means;

a port connected to the shift control means;

a port connected to the hydraulic pressure control means;

a port connected to the 2-3/4-3 shift valve; and a port connected to a first friction element acting as an input element in first, second, and third speeds of a drive D range.

3. The hydraulic control system of claim 1, wherein the 2-3/4-3 shift valve comprises:

two side ports for receiving hydraulic pressure from the shift control means to control a valve spool of the 2-3/4-3 shift valve;

a port connected to the 3-4 shift valve;

a port connected to the hydraulic pressure control means via the 1-2 shift valve; and a port connected to both a fourth friction element, acting as an input element in a reverse R range and the third speed of the drive D range, and connected to a chamber for disengaging a second friction element acting as a reaction element in second and fourth speeds of the drive D range.

4. The hydraulic control system of claim 1, wherein the 4-2 shift valve comprises:

a port connected to the control switch valve;

a port connected to the shift control means;

a port connected to the hydraulic pressure control means via the 1-2 shift control valve;

a port connected to the 3-4 shift valve; and a port connected to a third friction element acting as an input element in third and fourth speeds of the drive D range.

5. The hydraulic control system of claim 1, wherein the 1-2 shift valve comprises:

a port connected to the range control means;

a port connected to the hydraulic pressure control means;

a port connected to the shift control means;

a port connected to a fifth friction element acting as a reaction element in the reverse R range; and a port simultaneously connected to the 2-3/4-3 shift valve, the 4-2 shift valve, and the control switch valve.

6. The hydraulic control system of claim 1, wherein the control switch valve comprises:

a port connected to the range control means;

a port connected to the shift control means through a line along which line pressure flows in third and fourth speeds;

a port connected to the hydraulic pressure control means via the 1-2 shift valve;

a port connected to the shift control means through a line along which line pressure flows in second, third, and fourth speeds;

a port connected to a chamber for engaging a second friction element acting as a reaction element in second and fourth speeds of the drive D range; and a port connected to a third friction element acting as an input element in third and fourth speeds of the drive D range.

7. The hydraulic control system of claim 4, wherein the hydraulic pressure in the third friction elements is exhausted through the shift control means via the control switch valve and the 4-2 shift valve.

* * * * *